(12) United States Patent
Lamouline

(10) Patent No.: US 7,828,219 B2
(45) Date of Patent: Nov. 9, 2010

(54) PRINTED DOCUMENT AND CONTROL SYSTEM

(75) Inventor: Thierry Lamouline, Tassin la Demi Lune (FR)

(73) Assignee: Yooget, Lyons (FR)

( * ) Notice: Subject to any disclaimer, the term of this patent is extended or adjusted under 35 U.S.C. 154(b) by 568 days.

(21) Appl. No.: 11/663,427

(22) PCT Filed: Sep. 20, 2005

(86) PCT No.: PCT/FR2005/002327

§ 371 (c)(1),
(2), (4) Date: Mar. 21, 2007

(87) PCT Pub. No.: WO2006/032777

PCT Pub. Date: Mar. 30, 2006

(65) Prior Publication Data

US 2007/0262159 A1    Nov. 15, 2007

(30) Foreign Application Priority Data

Sep. 23, 2004   (FR) ................... 04 10071

(51) Int. Cl.
*G06K 19/067*    (2006.01)
(52) U.S. Cl. .................................... 235/492
(58) Field of Classification Search ............. 235/492

See application file for complete search history.

(56) References Cited

U.S. PATENT DOCUMENTS

| | | | |
|---|---|---|---|
| 6,342,830 B1 * | 1/2002 | Want et al. ............. | 340/572.7 |
| 7,027,039 B1 * | 4/2006 | Henty .................... | 340/539.1 |
| 7,061,083 B1 * | 6/2006 | Usami et al. ............ | 257/679 |
| 2003/0061705 A1 * | 4/2003 | Smeyak et al. ........... | 29/601 |
| 2003/0130015 A1 * | 7/2003 | McTaggart ............... | 455/569 |
| 2003/0214388 A1 * | 11/2003 | Stuart et al. ........... | 340/572.8 |
| 2004/0074676 A1 | 4/2004 | Romansky et al. | |
| 2004/0124248 A1 * | 7/2004 | Selker ................... | 235/492 |
| 2004/0131897 A1 * | 7/2004 | Jenson et al. ........... | 429/7 |
| 2004/0134994 A1 * | 7/2004 | Zaba et al. ............. | 235/492 |
| 2005/0242957 A1 * | 11/2005 | Lindsay et al. .......... | 235/492 |
| 2007/0268113 A1 * | 11/2007 | Johnson ................. | 340/10.1 |

FOREIGN PATENT DOCUMENTS

| | | |
|---|---|---|
| DE | 197 40 893 | 3/1999 |
| DE | 299 04 828 | 6/1999 |
| FR | 2 828 953 | 2/2003 |
| WO | 01/91045 | 11/2001 |
| WO | 03/096268 | 11/2003 |

* cited by examiner

*Primary Examiner*—Thien M. Le
*Assistant Examiner*—Christle I Marshall
(74) *Attorney, Agent, or Firm*—Young & Thompson

(57) ABSTRACT

Printed document 3 includes at least one microcircuit capable of generating and transmitting a signal that allows identifying a microcircuit and contact parts in series with the microcircuit 5 for the activation of the microcircuit 5.

18 Claims, 4 Drawing Sheets

PRINTED DOCUMENT AND CONTROL SYSTEM

BACKGROUND OF THE INVENTION

1. Field of the Invention

This invention pertains to the domain of triggering an operation in an information system, such as a network, especially of Internet type. Information system means any computer or telecommunication hardware, such as computer, PDA, mobile phone, etc.

2. Description of the Related Art

We know about Radio Frequency Identification (RFID) for a number of years. This process is currently used to recognise products or objects, for example, in the field of logistics, making payments at the cash counters or even tracking activities. We can refer to documents available on the Internet:// www.techbourse.com/analyses/microcircuit electronique-20000830.htm.

The first semi-conducting inks that allow making electronic circuits simply by printing on a document are well-known.

Physically, the RFID labels are made up of a chip and an antenna generally coiled in spires around the chip. The device is more often passive and the antenna captures certain frequencies that provide it with sufficient energy to enable it to transmit its unique identification code. The sensitivity and reliability of reading the RFID label depends mainly on the antenna's size and shape. Some of the more sophisticated devices have sensors that let them identify physical parameters such as temperature of, for example, frozen products, or even the exceeding the threshold, for example, of the level of liquid in a bottle. We can refer to a relevant article available on the Internet: http://xmlfr.org/actualites/decid/O31128-0001.

SUMMARY OF THE INVENTION

This invention is aimed at controlling a computer operation by activating/deactivating a microcircuit.

A printed document, based on an embodiment, comprises of at least one microcircuit capable of generating and transmitting a signal that allows identifying the microcircuit and contact parts in series with the microcircuit for the activation of the said microcircuit. By placing a conducting object on at least two contact parts, we get a closed switch and thus activate the microcircuit, which is used for identifying and triggering a determined computer operation associated with the microcircuit. The conducting object can be metallic or metal plated object, or for example, a pen, a mobile phone housing or could be the finger of a person wherein the humidity is generally sufficient to make an electric contact between the two contact parts.

The microcircuit can be printed, especially on a medium that is part of the document. The document can include a sheet of paper, several microcircuits and an antenna common to at least two microcircuits. The antenna is common in such a way as it is connected or capable of being connected to at least two microcircuits. The microcircuits can be RFID labels. The contact parts can be the switches. Each microcircuit can be connected to at least one switch.

In an embodiment, the device comprises of a microcircuit power supply. The supply can be a battery and/or a photovoltaic receiver that can capture ambient light and transform it into electrical energy that will then be supplied to the battery or even to a condenser or even directly to the microcircuit.

The supply can also comprise an antenna, whether or not linked to a battery. The antenna can be printed using a conducting ink.

Advantageously, the microcircuit and the power supply are linked by a connection forming an open circuit in steady state and (when triggered), a closed circuit to activate the said microcircuit. In other words, when the contact parts are open, the microcircuit is not supplied with power and therefore remains off. On the other hand, when the contact parts are closed, the microcircuit is powered and this enables it to be identified.

In an embodiment, the connection comprises a switch.

Advantageously, the switch comprises the said contact parts.

Moreover, the contact parts are accessible from the outside. Thus, a user can easily close the circuit between the contact parts.

In an embodiment, the contact parts are electrically insulated from each other to form an open electric circuit. A contact part can be linked to the microcircuit and a contact part can be linked to an antenna. As a variant, the two contact parts can be linked to the microcircuit.

In an embodiment, the device comprises an antenna to transmit and/or receive signals to or from the microcircuit. The said antenna can also be used to supply electrical energy.

In an embodiment, the device comprises a plurality of microcircuits and associated contact parts and at least one antenna linked to the said microcircuits. A common antenna can thus serve several microcircuits powered selectively and thus activated by contact parts provided for this purpose. At least two microcircuits can comprise a common part.

In an embodiment, the contact parts are made up of two alternate conducting line beams, electrically insulated by ambient air and the paper and/or insulating ink and covering a determined area of the paper, placed such that the contact of a determined conducting object on any part of the said surface establishes an electric contact between the parts.

In an embodiment, the document comprises an antenna forming an element for transmission of control commands.

The control system may comprise a printed document and a radio transmitter/receiver for exchanging signals with the document.

In an embodiment, the transmitter/receiver is linked to a computing tool for triggering a computer operation upon receiving information coming from the transmission element through the transmitter/receiver.

In an embodiment, a control command generation and transmission element, constituted by the microcircuit and the antenna, is inactive in steady state and active only during a user-defined action. The said action may consist of placing a conducting object on a given support of the said printed media. The document, which may be made economically by printing, is used to selectively trigger computer operations at some distance around the said documents.

In an embodiment, a printed document is provided with text and/or image of a device capable of generating and transmitting a signal for identification of the said device and the contact parts for signal transmission.

The invention may be used in an interesting manner in the field of mail-order selling. Several clients prefer looking at a paper catalogue rather than a computer screen. The catalogue holder may select a product by placing the finger or in general any conducting object on a specific area of the catalogue devoted to a given product. The area that allows making an electrical connection may be a specific portion of the area devoted to the given product or the entire area. The said area shall be named "Activation area". When the electrical contact is made, the microcircuit associated with the said activation area becomes active and can transmit, through an antenna, a signal containing a unique code. The signal containing the unique code can then be detected by a receiver located nearby and connected to a computer. The computer receiving the unique code shall then trigger a specific computerised operation, for example, opening an Internet page corresponding to the said code. The Internet page may have content identical to the area devoted to the given product or can be directly an order form that can be automatically filled. The invention therefore allows, for example, ordering products without effort, from a paper catalogue which is nicer to look at than a screen catalogue and without having to fill an order form manually or by using a keyboard.

BRIEF DESCRIPTION OF THE DRAWING FIGURES

This invention shall be understood better on reading the detailed description of some embodiments taken as examples by no manner limiting, and illustrated by appended drawings, where:

DETAILED DESCRIPTION OF THE INVENTION

Figure 1:
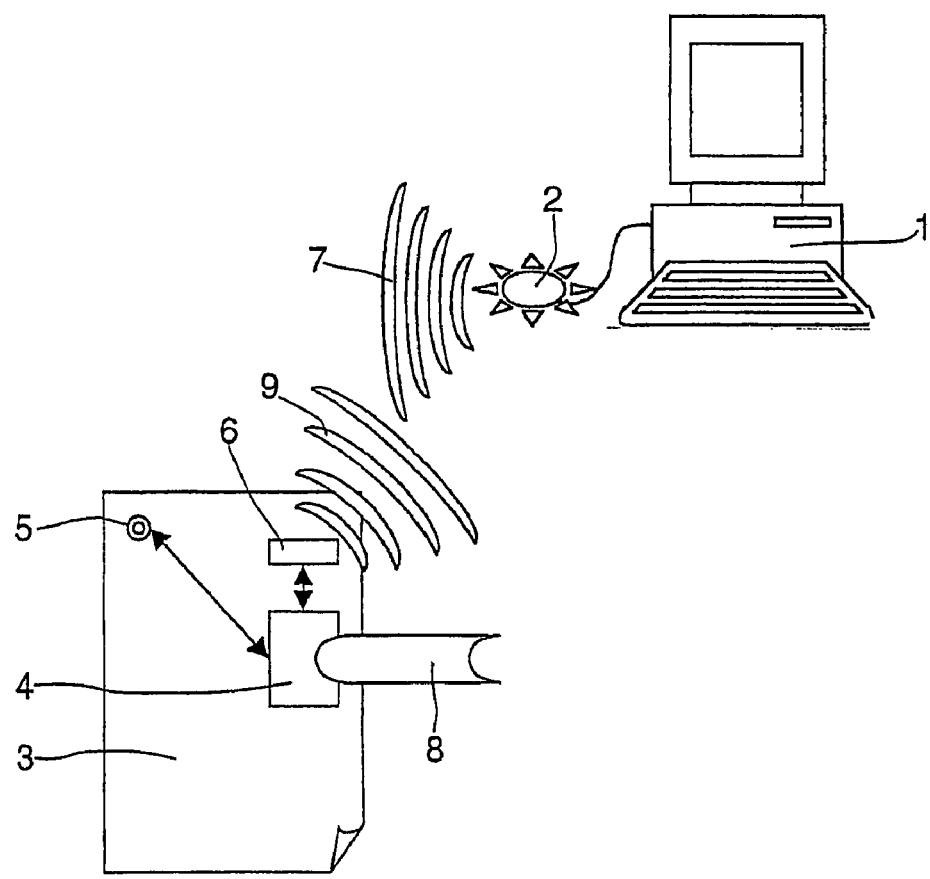
FIG. 1 is a schematic view of a system as per the invention.

It is proposed to activate a printed microcircuit on a document by placing a conducting object at a specified location of the said document, which allows, if we have an appropriate recognition system, to identify the said microcircuit and trigger a specified computer operation associated in a unique manner to the said microcircuit. The microcircuit can be the chip of a RFID label.

In other terms, an embodiment may be implemented using a device connected to a computing tool and which allows receiving electromagnetic waves, for example radio waves. We shall call this device a transmitter/receiver. The document can be provided with one or more specific inks, whether or not visible, whether or not printed in layers, possibly separated by an insulating layer, whether or not transparent, enabling two types of geometric structures to be printed corresponding to two functions; a function of an element for the generation and transmission of control command which, on receiving the signal sent by the transmitter/receiver, and in case of activation, sends a specific signal that shall be captured by the transmitter/receiver, and a function of activation zone that enables, by contact with a determined object, for example the metallic point of a pen or the end of a finger, the activation of an element for generation and transmission of the given control command.

The control command generation and transmission element comprises an antenna and a microcircuit electrically connected with each other. The microcircuit can be a transponder. The antenna is meant to receive a determined electromagnetic signal transmitted by a transmitter and transmit it to the microcircuit to which the said antenna is connected. The microcircuit, in response to a specific signal transmitted by the transmitter/receiver and captured by the antenna, transmits a determined signal to the antenna, also called "signature". The antenna transmits the determined electromagnetic signal to a receiver that is sent by the microcircuit in response to the received signal.

In this embodiment, the control command generation and transmission elements, when in presence of an appropriate transmitter/receiver, are not meant to receive and retransmit the said signals permanently and all together, but only transmit/receive the signal individually when an operator is active. Due to this, the technical constraints are totally different from the constraints usually encountered, for example, in the field of RFID labels, especially the recognition by the receiver of a set of signatures simultaneously transmitted by a large number of RFID labels and the resolution of the problem of interaction of RFID label antennas amongst themselves, for example in the case of piling up of RFID labels.

On the other hand, the activation of a particular control command generation and transmission element by placing a conducting object on a certain part of a document is used to overcome the above problems and provides communication between the control command generation and transmission element and the transmitter/receiver at a distance that falls between a range defined by the antenna characteristics. Thus, a document is printed with any number of control command generation and transmission elements made up of a microcircuit and an antenna. Each of these control command generation and transmission elements is unique, which means, when the said control command generation and transmission element is active, it returns a unique signal, in response to the signal that it receives from the transmitter/receiver, to a transmitter/receiver with which it is compatible. The unique signal is also called "signature". There is therefore a bijection between the control command generation and transmission elements and their signature. Each control command generation and transmission element is linked to one or more activation zones printed on the document.

A computing tool is provided with a transmitter/receiver that transmits and receives electromagnetic waves permanently. The transmitter/receiver is compatible with the control command generation and transmission elements present in the document, meaning that the electromagnetic waves that it transmits are captured by the control command generation and transmission elements and that an activated control command generation and transmission element returns to the said transmitter/receiver its signature in the form of a signal that is recognised by the transmitter/receiver. The document should be placed in the transmitter/receiver functioning zone from some centimeters to some meters. By default, in absence of appropriate contact in the activation zone associated with a control command generation and transmission element, none of the document control command generation and transmission elements is activated. The transmitter/receive does not receive a signal in return for the waves that it transmits. When a user makes contact with a conducting object on an activation zone printed on the document, the microcircuit associated with the activation zone is activated instantaneously. This activation is noted by the transmission of the microcircuit's signature through the antenna to which the said microcircuit is associated, in response to the signal transmitted by the transmitter/receiver. The signature captured by the transmitter/receiver is then interpreted, either by the transmitter/receiver itself, or by a computing tool to which the said transmitter/receiver is connected, in order to trigger a specific computer operation. Advantageously, the signature non-ambiguously corresponds to a specific digital instruction recorded in a database in association with an identifier present in the signature. When the signature is decoded by the computing tool, this then operates the specific computer instruction.

The associated computer operation may consist of opening a file in the computing tool to which the transmitter/receiver is connected, with the file being present in the computing tool itself or on a computer network to which the computing tool is connected. The associated computer operation may consist of entering in an active entry field on the computing tool's screen, of an associated character string in an unbivalent manner, for the microcircuit's signature.

In another embodiment, the computing tool may be a telephone and the associated computerised operation is the automatic dialing of a telephone number, whether or not associated with the transmission of a specific identifier. The file address or the computing instruction or the telephone number and possibly the associated identifier, can be directly coded in the microcircuit. Thus, the simple interpretation of the signature triggers the associated computerised operation, without it being necessary to use the intermediary database.

In an embodiment, the signature contains several codes, with one of these codes corresponding to the activation on the computing tool of a specific computer application, another of these codes corresponding to a specific instruction of the said computerised operation, and another of these codes corresponding to a specific identifier that can be operated by the computerised instruction.

In an embodiment, a code present in the signature is used to determine with which type of computing tool the signature is compatible. For example, if several computing tools, having the system, are found in the transmitting and receiving perimeter of a document, this code can trigger an operation in one of these tools, for example a computer, but not in others, for example, the telephones.

In an embodiment, a document contains several microcircuits, with each microcircuit characterised by its signature. Each microcircuit is associated with one or more activation zones. When the user places a conducting object on an activation zone, the system only activates the microcircuit associated with this zone, from all the document's microcircuits, thereby making it possible to precisely determine the signature and to implement the associated instruction.

In an embodiment, the activation zone forms an electric switch between the microcircuit and the antenna. By default, the switch is open; no electrical signal can circulate between the microcircuit and the antenna. The microcircuit therefore does not receive any signal and does not transmit any either. The control command generation and transmission element made up of the microcircuit and an antenna is inactive. When a user creates a contact in the activation zone using a specific object, the said zone then acts as a closed switch between the antenna and the microcircuit. If the antenna captures an appropriate signal originating from a transmitter, the said signal can then be transmitted to the microcircuit that reacts by returning a specific signal to the antenna in response to the received signal and the antenna transmits this signal to the receiver. The time required for this operation, some hundredths of seconds, is negligible in relation to the duration of pressing the object on the document. During this contact, the microcircuit is active.

In an embodiment, the activation zone comprises two structures printed using an electrically conducting ink. In all points of the activation zone, the distance between the two structures is at least equal to the minimum distance needed to ensure electrical insulation between them by the paper and the ambient air, and at the most equal to the maximum permissible distance so that the said structures are electrically connected by the contact of the specific conducting object.

The activation zone can have two printed lines, of any style, which do not join or intersect each other at any time and are located in relation to each other at a minimum and maximum distance as per the requirements given above.

In another embodiment, the activation zone comprises two beams of printed lines, of any style such that each line of a set neither join nor intersect at any time any line of the other set, wherein, at all points of the activation zone, the said sets are located in relation to each other at such a distance that the requirements given above are fulfilled. This configuration has two advantages. As the contact is made through the line beams, interrupting a conducting line is not sufficient to render the system inoperable. All the lines can cover an area as large as required, thus rendering a portion of the document active of any size, for example the entire area of a photograph. The object used to make electric contact on the activation zone can be the tip of an operator's finger. In normal condition, the electrical resistance of skin is very low in comparison to that of the paper and can therefore be considered as conducting as long as the paper is insulating. When the skin's condition is very dry, it may be preferable to use a conducting object, such as the metallic point of a pen.

In an embodiment, a plurality of microcircuits is linked to the same antenna, which is used to reduce the number of antennas and optimise the characteristics of the printed antenna. In this embodiment, only one microcircuit at a time at any given moment is linked to the antenna. This configuration is especially advantageous in terms of the system's operation. In fact, the transmission and reception capability of an antenna is overall proportional to the area covered by the spires of the antenna. This area is equal to the product between the average area of a spire and the number of spires. Thus, higher the average area of a spire, larger is the transmission and reception capacity of the antenna. It is therefore interesting to have antennas that have spires covering the largest area possible. In case of a document to be printed, the largest area is equal to the area of the document's page itself. A standard RFID label antenna generally occupies a square with 5 cm side, that is, an area approximately twenty three times less than that of an A4 size page. As a first approximation, an antenna covering the perimeter of an A4 size page shall therefore be twenty-three times more efficient, given that the number of spires are equal compared to a standard RFID label antenna. Therefore it is advantageous to print the antenna on the boundary of a document's page and to link each microcircuit through one or more activation zones of the said antenna.

In an embodiment, the microcircuits, activation zones, antenna(s) as well as links between these elements are inserted using a software system that is used to define the activation zones of a document, create the file of each activation zone and insert it in the document's file, automatically create the file of microcircuits to be printed and automatically insert them in the document's file, automatically create the files of the antenna(s) to be printed and insert them in the document's file, associate a microcircuit with one or several activation zones by automatically defining the link paths between the microcircuits, the activation zones and the antennas, and to make the file usable for printing using suitable inks.

In another embodiment, the conducting object is used to amplify the signal received and transmitted by the antenna associated with the microcircuit. The contact parts no longer constitute a switch but the base of an external antenna.

On a document at least one control command generation and transmission element made up of a linked microcircuit and a printed antenna is printed. The antenna is made such that when it is placed at a distance from the transmitter/receiver located within the specified range, the signal transmitted by the antenna to the receiving microcircuit from the one transmitted by the transmitter and/or the one transmitted by the control command generation and transmission element to the receiver, is too weak to be captured and interpreted by the recipient, control command generation and transmission element or receiver. When a user places a conducting object in contact with the antenna, the said object and/or the user's body constitutes an electromagnetic antenna which amplifies the signal received and/or transmitted by the control command generation and transmission element adequately so the signal thus received and/or transmitted can be used. Thus, the activation zone of a control command generation and transmission element is made up of its antenna itself.

As we can see in FIG. 1, a computing tool 1, for example, a computer comprising a central unit, a screen and a keyboard, is linked to a transmitter/receiver 2. Here the link is wired. It is understood that a link using infrared waves, electromagnetic waves or other can be planned. A document 3, for example a paper sheet, received or print of a microcircuit 5 and antenna 6, and activation zone 4 meant to activate the microcircuit 5 when the said activation zone is touched by a conducting object. The microcircuit 5 and the antenna 6 constitute a circuit, which, when it is activated and is subject to an electromagnetic wave originating from the transmitter/receiver 2, allow transmitting in turn a specific signature captured by the transmitter/receiver 2. This document can receive any number of microcircuits 5, activation zones 4 and antennas 6.

When the system's user activates the transmitter/receiver 2, for example, through an order to the computing tool 1, the said transmitter/receiver 2 transmits an electromagnetic signal 7. The document 3 is within the transmission and receiving perimeter of the transmitter/receiver 2, that is, it is generally at a distance ranging from a few centimeters to a few meters. The activation zone 4 is made up of contact parts. In the absence of the conducting contact, the activation zone 4 constitutes an open switch between the microcircuit 5 and the antenna 6. The printed microcircuit on the document 3 is therefore inactive. When a user places a conducting object 8 on the activation zone 4 printed on the document 3, the activation zone 4 then constitutes a closed switch between the microcircuit 5 associated with it and the antenna 6. The microcircuit 5 then receives the signal 7 originating from the transmitter/receiver 2 captured by the antenna 6. In response to the signal 7 and through the antenna 6, the microcircuit 5 transmits a signal 9 containing a specific code or signature. If the document 3 is found within the transmission and receiving perimeter of the transmitter/receiver 2, the transmitter/receiver 2 sense the signal 9 and transmits the signature to the computing tool 1 that triggers the associated specific operation to the signature.

Figure 2:
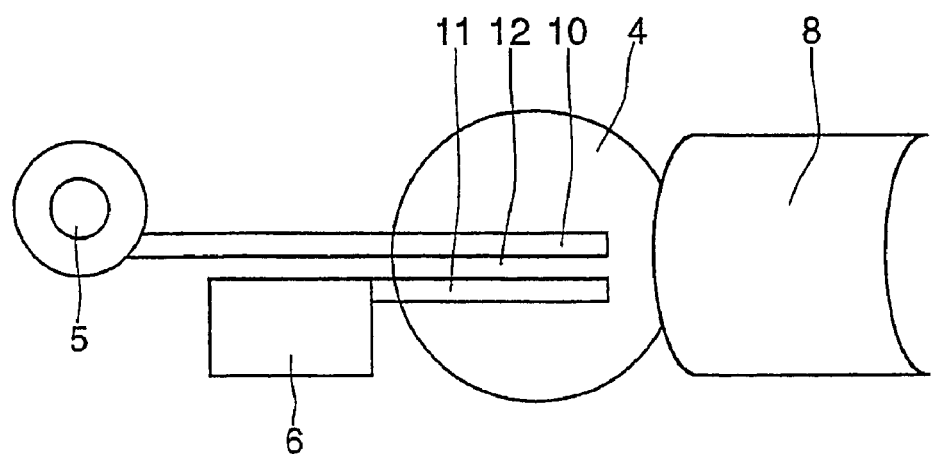
FIG. 2 is a schematic view of a portion of document according to the feature of the invention.

As we can see in FIG. 2, an activation zone 4, a microcircuit 5 and an antenna 6 are printed on a document. The microcircuit 5 is electrically linked to the activation zone 4. The antenna 6 is electrically linked to the activation zone 4. The activation zone 4 comprises of two conducting lines 10 and 11 printed using an electrically conducting ink and electrically separated at all points by an insulating zone 12 made up of the document's paper and ambient air. In absence of contact with an outside conducting object, the activation zone 4 forms an open switch. There is therefore no electrical connection between the microcircuit 5 and the antenna 6. The microcircuit is inactive. When a user places an appropriate conducting object 8 on the activation zone 4, the contact is established between the two conducting lines 10 and 11. The activation zone 4 forms a closed switch between the microcircuit 5 and the antenna 6. The microcircuit is activated.

Figure 3:
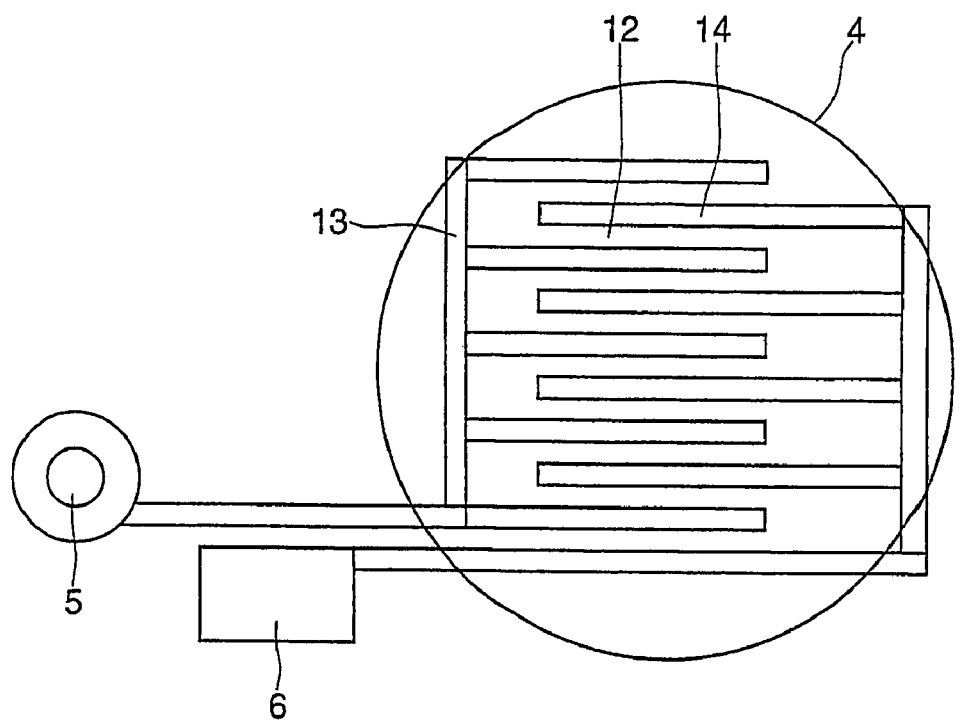
FIG. 3 is a variant of FIG. 2.

As we can see in FIG. 3, the activation zone 4 comprises of two beams 13 and 14 of lines printed using an electrically conducting ink separated by an insulating zone 12 that may be made up of the document's paper and ambient air. The operation of the activation zone 4 is similar to the one illustrated in FIG. 2.

Figure 4:
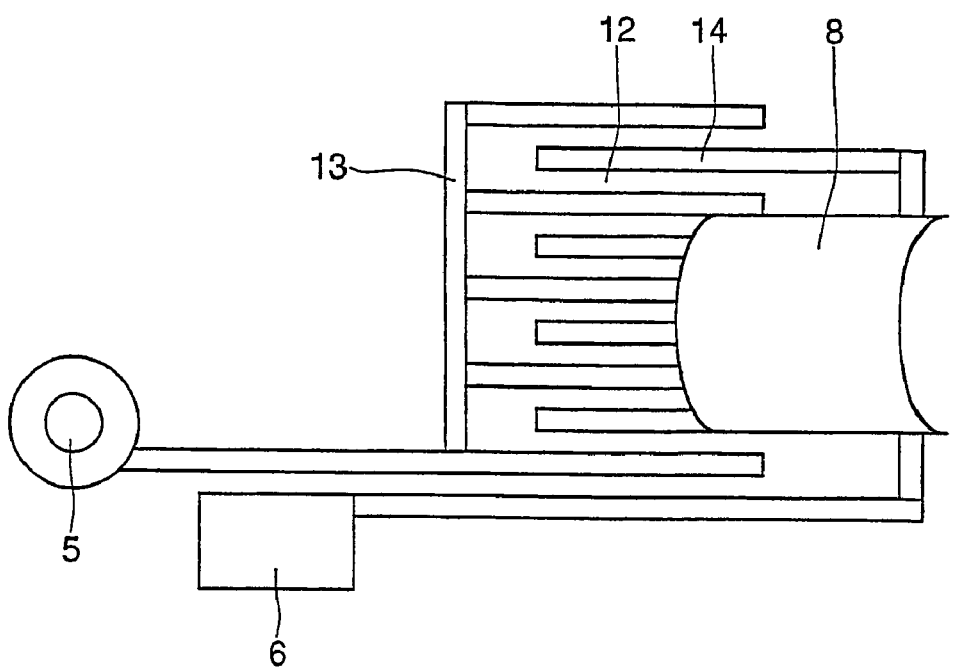
FIG. 4 shows the implementation of the FIG. 3 document.

By referring to FIG. 4, we see that the conducting object 8 allows short-circuiting the conducting lines 13 and 14 and closing the electrical circuit between the microcircuit 5 and the antenna 6.

Figure 5:
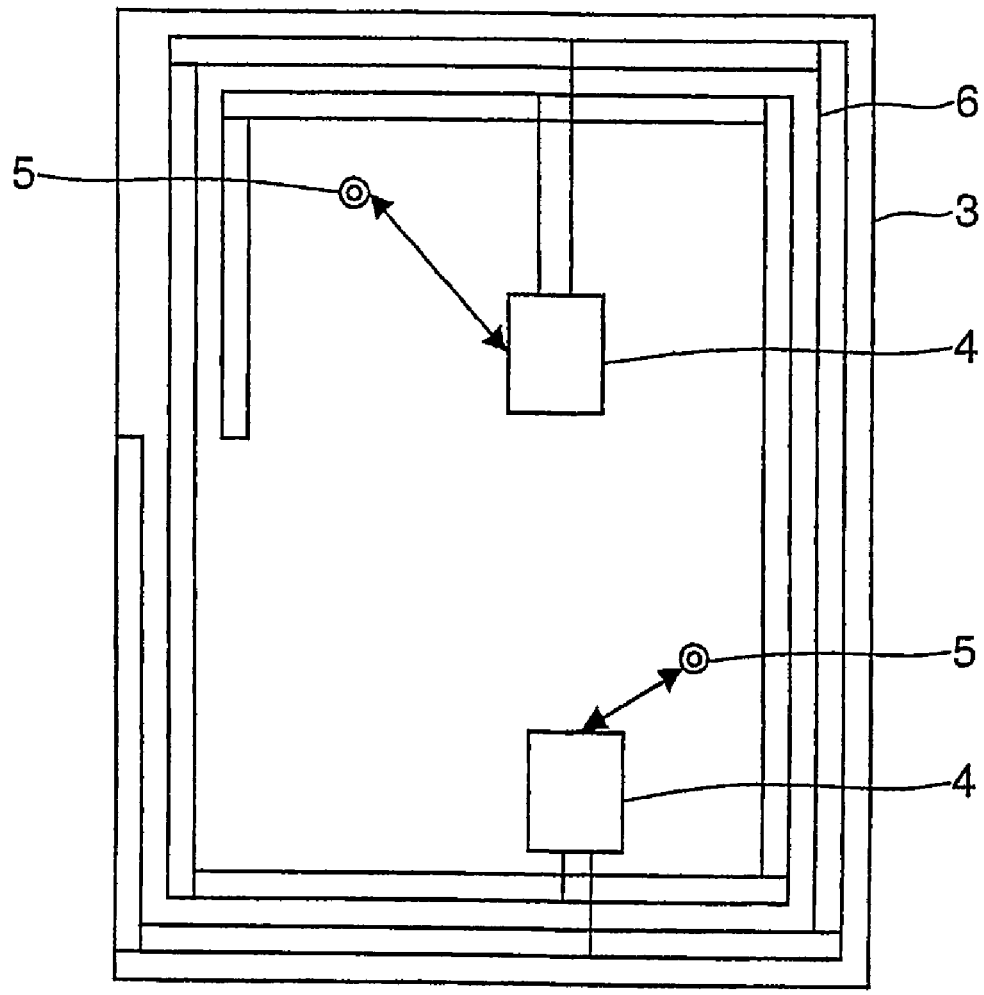
FIG. 5 is a schematic view of a document according to another feature of the invention.

In the embodiment illustrated in FIG. 5, the document 3 is provided with an antenna 6, two microcircuits 5 and two activation zones 4. Each microcircuit 5 is linked to an activation zone 4. The two activation zones 4 are linked to the single antenna 6. The antenna 6 was made on the boundary of the document 3, such that the area framed by the spires of the said antenna 6 is the largest possible. The function is similar to the one described earlier. In the absence of conducting object placed on the activation zones 4, the said activation zones 4 form open switches. The microcircuits are inactive. When a user places a conducting object on an activation zone 4, the electrical contact is made between the microcircuit 5 associated with the activation zone 4 and the antenna 6. The microcircuit is thus activated and transmits its signature through the common antenna 6. The operation is identical if the other activation zone 4 is activated.

Figure 6:
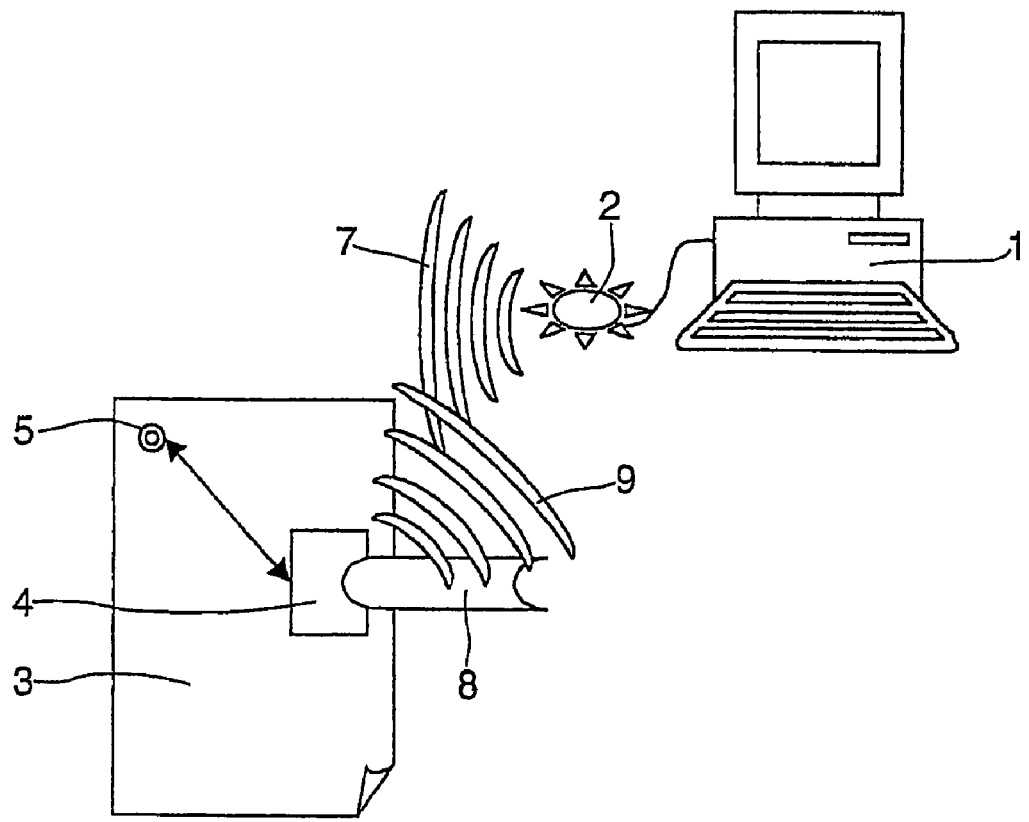
FIG. 6 shows a variant of FIG. 1.

In the embodiment illustrated in FIG. 6, the computing tool I and the transmitter/receiver 2 are similar to those illustrated in FIG. 1. The document 3 is provided with both types of active zones, an activation zone 4 and a microcircuit 5 linked electrically. The activation zone 4, when touched by a specific conducting object, is meant to act as the antenna associated with the microcircuit to form a control command generation and transmission element. During activation, the microcircuit 5 allows transmitting a signature in response to an electromagnetic wave originating from the transmitter/receiver 2, in the form of a signature. In absence of conducting contact, the activation zone 4 constitutes an antenna which is inadequate to transmit the signal originating from the transmitter/receiver 2 to microcircuit 5, or originating from the microcircuit 5 to the transmitter/receiver 2. The control command generation and transmission elements constituted by the microcircuit 5 and the activation zone 4 of document 3 are therefore inactive. When the user places a conducting object 8, for example a finger, on the activation zone 4 printed on the document 3, the system formed by the activation zone 4 and the conducting object 8, for example the human body, constitutes an antenna with an electromagnetic transmission/reception capability largely greater than that of the activation zone 4 by itself. The microcircuit 5 then receives the signal 7 originating from the transmitter/receiver 2 captured by the antenna formed by the conducting object 8 and the activation zone 4. The microcircuit 5 transmits a signal 9 containing a code or signature of the microcircuit towards the activation zone 4. The signal 9 is transmitted by the system made up of the activation zone 4 and the conducting object 8. If the document 3 is found within the transmitting and receiving perimeter of the transmitter/receiver 2, the transmitter/receiver 2 captures the signal 9 and transmits the signature to the computing tool I that triggers the associated given operation to the signature.

It therefore allows a simplified and friendly method for using a catalogue by offering the comfort of a catalogue on paper media and the facility to order provided by a catalogue displayed on the screen of a computing tool. The user can therefore trigger a computer operation, for example, the filling of an order form, simply by touching a photograph of the object that he wants to order with a finger.

The invention claimed is:

1. A printed document (3), comprising:
    at least one microcircuit (5) adapted to generate and transmit a signal that allows identifying the microcircuit (5) and printed contact parts in series with the microcircuit (5) for an activation of the said microcircuit (5); and
    a sheet of paper, a plurality of the microcircuits and an antenna common to at least two microcircuits, the microcircuits comprising RFID labels, contact parts forming a plurality of switches and each microcircuit is connected to at least one switch,
    wherein the contact parts comprises two alternate conducting line beams (13, 14), electrically insulated by ambient air and at least one of the paper or insulating ink and covering a specific area of the paper, placed such that contact of a determined conducting object on any part of the specific area of the paper makes an electric contact between the parts.

2. The document according to claim 1, wherein the microcircuit is printed.

3. The document according to claim 1, further comprising an electrical supply for the microcircuit.

4. The document according to claim 3, wherein the electrical supply comprises a battery.

5. The document according to claim 3, wherein the electrical supply comprises an antenna (6).

6. The document according to claim 5, wherein the antenna is printed using a conducting ink.

7. The document according to claim 3, wherein the electrical supply comprises a photovoltaic receiver.

8. The document according to claim 3, wherein the microcircuit and the power supply are linked by a connection forming an open circuit in steady state and a closed circuit to activate the said microcircuit.

9. The document according to claim 8, wherein the connection comprises a switch.

10. The document according to claim 8, wherein the connection comprises the said contact parts.

11. The document according to claim 1, further comprising of an antenna (6) adapted to at least one of transmit or receive signals to or from the microcircuit.

12. The document according to claim 1, wherein the contact parts are accessible from the outside.

13. The document according to claim 1, wherein the contact parts are electrically insulated from each other to form an open electric circuit.

14. The document according to claim 1, comprising several microcircuits and associated contact parts and one antenna linked to the said microcircuits.

15. A control system comprising a document according to claim 1, comprising a radio transmitter/receiver (2) meant for exchanging signals with the document (3).

16. The system according to claim 15, wherein the transmitter/receiver (2) is linked to a computing tool (1) adapted to trigger a computer operation for receiving an information originating from a control command generation and transmission element formed by a microcircuit and an antenna through the transmitter/receiver.

17. The system according to claim 16, wherein the microcircuit is inactive in steady state and active only during a user-defined action.

18. The system according to claim 15, wherein a microcircuit signature contains several codes, with one of these codes corresponding to an activation on a computing tool of a specific computer application, another of these codes corresponding to a specific instruction of a computer operation, and another of these codes corresponding to a specific identifier that can be operated by a single computer instruction.

* * * * *